(12) United States Patent
Belcher et al.

(10) Patent No.: US 6,812,839 B1
(45) Date of Patent: Nov. 2, 2004

(54) USE OF ROTATING MAGNETIC FIELD TO ENHANCE COMMUNICATION WITH RF BURST-TRANSMITTING TAGS OF OBJECT LOCATION SYSTEM

(75) Inventors: Donald K. Belcher, Rogersville, TN (US); Ronald J. Hash, Rogersville, TN (US)

(73) Assignee: Wherenet Corp, Santa Clara, CA (US)

( * ) Notice: Subject to any disclaimer, the term of this patent is extended or adjusted under 35 U.S.C. 154(b) by 451 days.

(21) Appl. No.: 09/818,276

(22) Filed: Mar. 27, 2001

Related U.S. Application Data

(63) Continuation-in-part of application No. 09/800,079, filed on Mar. 6, 2001, and a continuation-in-part of application No. 09/759,290, filed on Jan. 11, 2001, and a continuation-in-part of application No. 09/689,340, filed on Oct. 12, 2000

(60) Provisional application No. 60/192,317, filed on Mar. 27, 2000.

(51) Int. Cl.[7] .................................................. G08B 13/14
(52) U.S. Cl. .................. 340/572.1; 340/505; 340/572.4
(58) Field of Search ........................... 340/572.1, 572.2, 340/572.3, 572.4, 505, 573.1, 551, 572.7

(56) References Cited

U.S. PATENT DOCUMENTS

| | | | | |
|---|---|---|---|---|
| 4,551,712 A | * | 11/1985 | Fockens | 340/572.2 |
| 5,204,526 A | * | 4/1993 | Yamashita et al. | 235/493 |
| 5,258,766 A | * | 11/1993 | Murdoch | 343/742 |
| 5,559,507 A | * | 9/1996 | Beigel | 340/10.34 |
| 5,594,420 A | * | 1/1997 | Copeland et al. | 340/572.3 |
| 5,920,287 A | | 7/1999 | Belcher et al. | 342/450 |
| 5,952,922 A | * | 9/1999 | Shober | 340/572.4 |
| 5,995,046 A | | 11/1999 | Belcher et al. | 342/450 |
| 6,307,468 B1 | * | 10/2001 | Ward, Jr. | 340/505 |
| 6,392,547 B1 | * | 5/2002 | Stewart et al. | 340/573.1 |

* cited by examiner

*Primary Examiner*—John Tweel
(74) *Attorney, Agent, or Firm*—Allen, Dyer, Doppelt, Milbrath & Gilchrist, P.A.

(57) ABSTRACT

Magnetic field-based communication with an object is enhanced by generating a rotating AC magnetic field that effectively ensures magnetic field coupling with the magnetic field sensor of the object, irrespective of the orientation of the object. The rotating AC magnetic field is produced by a diverse spatial orientation (a two-dimensional arrangement) of a plurality of magnetic field coils, and the driving of those coils in a prescribed phase relationship (e.g., in phase quadrature) to realize a composite AC magnetic field that rotates (at the carrier frequency of the coil drive signal) over the entirety of the spatial coverage area.

13 Claims, 6 Drawing Sheets

USE OF ROTATING MAGNETIC FIELD TO ENHANCE COMMUNICATION WITH RF BURST-TRANSMITTING TAGS OF OBJECT LOCATION SYSTEM

CROSS-REFERENCE TO RELATED APPLICATION

The present application claims the benefit of co-pending U.S. Provisional Patent Application Ser. No. 60/192,377, by D. Belcher et al, filed Mar. 27, 2000, entitled: "Circular, Elliptical and Spherical Induction for Enhanced Proximity Detection and Communications" and is a continuation-in-part of co-pending U.S. Non-Provisional patent application Ser. No. 09/759,290, filed Jan. 11, 2001, by T. Harrington et al, entitled: "Proximity-Based Magnetic Field Generator for Controlling Operation of RF Burst-Transmitting Tags of Geolocation System" (hereinafter referred to as the '290 application), a continuation-in-part of co-pending U.S. Non-Provisional patent application Ser. No. 09/689,340, filed Oct. 12, 2000, by R. Hash et al, entitled: "Data Communication System Harnessing Frequency Shift Keyed Magnetic Field," (hereinafter referred to as the '340 application), and is also a continuation-in-part of co-pending U.S. Non-Provisional patent application Ser. No. 09/800,079, filed Mar. 6, 2001, by D. Belcher et al, entitled: "Ultra-Sensitive Magnetic Field Receiver Capable of Operating in High Noise Environments" (hereinafter referred to as the '079 application), each application being assigned to the assignee of the present application and the disclosures of which are incorporated herein by reference.

FIELD OF THE INVENTION

The present invention relates in general to object locating and tracking systems, including those of the type described in U.S. Patent to Belcher et al, U.S. Pat. Nos. 5,920,287, and 5,995,046, assigned to the assignee of the present application and the disclosures of which are incorporated herein, and is particularly directed to the generation of a rotating AC magnetic field that effectively maximizes magnetic field coupling with the magnetic field sensor of an RF burst-transmitting tag that comes within a prescribed proximity of a (tag-programming) magnetic field generator.

BACKGROUND OF THE INVENTION

The general architecture of the radio tagged object location systems described in the above-referenced '287 and '046 Patents is diagrammatically shown in FIG. 1 as comprising a plurality of tag emission readers 10 geographically distributed within and/or around an asset management environment 12. This environment contains a plurality of objects/assets 14, whose locations are to be monitored on a continuous basis and reported to an asset management database 20, which is accessible by way of a computer workstation or personal computer 26. Each of the tag emission readers 10 monitors the asset management environment for RF emissions from one or more RF-transmitter-containing tags 16 that are affixed to the objects 14. Each tag's transmitter is configured to repeatedly transmit or 'blink' a very short duration, wideband (spread spectrum) pulse of RF energy, that is encoded with the identification of the object and other information that may be stored in a tag memory.

These blinks or bursts of RF energy emitted by the tags are monitored by the readers 10, which are installed at fixed, and relatively unobtrusive locations within and/or around the perimeter of the environment being monitored, such as doorway jams, ceiling support structures, and the like. The output of each tag reader 10 is coupled to an associated reader processor. The reader processor correlates the spread spectrum RF signals received from a tag with a set of spread spectrum reference signal patterns, to determine which spread spectrum signals received by the reader is a first-to-arrive RF spread spectrum signal burst transmitted from the tag.

The first-to-arrive signals extracted by the reader output processors are forwarded to an object location processor within the processing subsystem 24. Using time-of-arrival differentiation of the detected first-to-arrive transmissions, the object location processor executes a prescribed multi-lateration algorithm to locate (within a prescribed spatial resolution (e.g., on the order of ten feet) the tagged object of interest.

In their normal mode of use, the tags exhibit a prescribed operational functionality, such as transmitting or 'blinking' an RF signal at a relatively slow repetition rate. The use of a relatively slow blink rate is due to the fact that most of the objects being tracked do not move frequently. However, there may be occasions where it is desired to change the operation of or otherwise communicate information to a tag, such as stopping the tag from blinking or causing it to start blinking, or to transmit additional data, such as that acquired from optional sensors or a data bus.

As another illustration, there are times when the objects to which the tags are attached are moved and may pass through one or more regions of the monitored environment where communications with the tags are desired. For example, the monitored environment may contain 'increased sensitivity' regions (such as doorways and the like) where more frequent tag transmissions are desired, in order to ensure that any objects passing therethrough will be readily tracked. One way to accomplish this particular task would be to simply program the tags to blink more frequently on a continuous basis. However, this approach is not acceptable for two reasons. First, more frequent tag transmissions on a continuous basis will shorten the battery life of the tag; secondly it would increase spectrum congestion.

In accordance with the invention disclosed in the above-identified '290 and '079 applications, the above-described tag-reprogramming function is readily achieved by placing an arrangement of one or more relatively short range, modulated magnetic field proximity-based, tag-programming generators or 'pingers' at a respective location of the monitored environment that is proximate to a region (such as a doorway) through which a tag may pass. This tag-programming pinger arrangement is operative to emit a non-propagating, AC magnetic field, that is sensed by the tag and used to controllably prompt (or program) the tag to take some action. As a non-limiting example, the tag reprogramming field may be used to cause the tag to immediately begin blinking at an increased rate for a relatively brief period of time, so as to alert the tag-tracking system of the presence of the tag in the region of interest.

Pursuant to the tag-programming scheme disclosed in the '290 application, the magnetic field is modulated or encoded with frequency shift keyed (FSK) encoding signals representative of digital data to be transmitted to the tag, using an FSK-encoded magnetic field based communication scheme of the type detailed in each of the '290 and '340 applications. The use of an FSK-encoded AC magnetic field using operational frequencies typically less than a few hundred KHz allows a large amount of data to be rapidly communicated to the tag.

An alternative approach is detailed in the '079 application, which has particular utility in an environment (such as an industrial facility), where such frequencies may be dominated by man-made and natural noise levels that limit performance, and where the function to be carried out may be relatively simple. In this alternative scheme, rather than use an FSK-encoded magnetic field communication link to transmit 'data' (where a fairly large (data) bandwidth may be required and increases susceptibility to interference), the programming magnetic field communication link employs a single frequency or is unmodulated. An example of such a simple function includes proximity detection or transmitting a relatively simple command, which considerably reduces the bandwidth requirement, and allows a reduced complexity communication implementation.

Irrespective of the type of AC magnetic field generation approach employed (modulated or nonmodulated), what is essential to successful operation of the magnetic field communication system is the absence of 'orientation nulls' in the magnetic field coverage for the 'increased sensitivity' region (such as a doorway and the like), so as to effectively guarantee than any tag entering that region will be fully operationally magnetically coupled with the generated field. These orientation nulls result from misalignment of the magnetic field transmit and receiver coil axes. Indeed, turning the axis of either coil orthogonal to that of peak performance can result in zero-coupling (an orientation null).

A reasonably acceptable resistance to this orientation null effect when the receiver coil lies in a given or fixed orientation can be achieved by sequentially shifting the vector orientation of the transmit field generator over three orthogonal axes. If the magnetic field receive system is comprised of two independent coils operating in such 'polarization diversity' (for example, the two receive coils are mutually orthogonal), the coupling performance is essentially coil orientation independent.

Previous attempts to solve the orientation null problem have involved sequentially generating a set of magnetic fields having three respectively different orientations. Unfortunately, this causes a substantial reduction in the rate at which information can be transmitted, since the same data must be repeated three times (one for each orientation).

SUMMARY OF THE INVENTION

In accordance with the present invention, the desire to effectively eliminate such an orientation null is successfully accomplished by a combination of the diverse spatial orientation of a plurality of magnetic field coils, and the driving of those coils in a prescribed phase relationship (e.g., in phase quadrature for spatially orthogonal coils) to realize a composite AC magnetic field that rotates (at the carrier frequency of the coil drive signal) over the entirety of the spatial coverage area.

From a practical standpoint, the spatial coverage area of the increased sensitivity region of a typical monitored environment, such as an exit or entry doorway, through which a tag may pass will customarily be two dimensional, making a two-dimensionally arranged coverage system both practical and cost effective. Moreover, the AC magnetic field produced by each generator's field coil is three-dimensional, and therefore includes a magnetic field component orthogonal to the plane of the rotating composite field vector.

The net result is that the rotating field coverage produced by a set of two-dimensionally orthogonally oriented phase offset generators provides on the order of better than ninety-nine percent coverage, regardless of tag orientation. If desired, the invention may be used to realize a three-dimensional or volumetric coverage, by distributing at least three coils along three mutually orthogonal coordinate axes relative to the monitored volume of interest, and driving the coils at respectively different phase offsets.

To produce an AC magnetic field with a two-dimensional rotation, a pair of magnetic field generator subsystems are spatially arranged such that the axes of their output coils are effectively coplanar with the two dimensional coverage area, and such that their fields are spatially orthogonal to and overlap one another in the coplanar region. In addition, for a given excitation AC frequency, the carrier drive signal applied to one magnetic field generator is offset in phase by a prescribed differential, e.g., a quarter of a cycle (or ninety degrees) relative to the carrier frequency for the other (spatially orthogonal) magnetic field generator.

For an equal amplitude drive signal and phase quadrature difference in phase, for identical generators, the resultant AC magnetic field produced will exhibit a generally circular rotation within the two dimensional coverage plane at the applied carrier frequency (e.g., on the order of 100 KHz). It has been found that circular coverage provided by such an orthogonally oriented of phase offset generators provides on the order of better than ninety-nine percent coverage, regardless of tag orientation.

In an alternative configuration, the phase of the coil drive signals may be other than ninety degrees and/or the coils may be spatially non-orthogonal. This would enable the shape of the resulting composite AC magnetic field to have an elliptical rather than a circular rotation.

If the invention is used to realize three-dimensional rotation of the AC magnetic field, three sets of coils are distributed along three mutually orthogonal coordinate axes adjacent to the monitored volume of interest. These spatially orthogonal coils are driven by three respective magnetic field generator arrangements, so that the three orthogonal AC magnetic fields produced thereby are spatially orthogonal to and overlap one another in the coplanar region. As in the two-dimensional system, for a given excitation AC frequency, the drive signal applied to a respective magnetic field generator subsystem is offset by a quarter of a cycle (or ninety degrees) relative to the drive signal for the other two (spatially orthogonal) magnetic field generator subsystems. As a result, for an equal amplitude drive signal for substantially identical generators, the composite AC magnetic field produced by the three orthogonal field generator subsystems will exhibit a generally spherical rotation within the coverage volume at the applied carrier frequency.

DETAILED DESCRIPTION

Before detailing the rotating AC magnetic field generation scheme of the present invention, it should be observed that the invention essentially resides in a magnetic field-based augmentation of an object monitoring and location system of the type described in the above-referenced Belcher et al Patents, and in particular to an enhanced coverage improvement of the AC magnetic field generation systems disclosed in the '290 and '079 applications. As such, the invention is readily implemented as an arrangement of RF and magnetic field communication circuits and associated digital signal processing components and attendant supervisory control circuitry therefor, that controls the operations of such circuits and components.

The configuration of such circuits components and the manner in which they interface with other communication system equipment have, accordingly, been illustrated in a readily understandable block diagram format, depicting only those details that are pertinent to the present invention, so as not to obscure the present disclosure with details which will be readily apparent to those skilled in the art having the benefit of the description herein. Thus, the block diagram illustrations are primarily intended to show the major components of a tag-based geolocation system in a convenient functional grouping, whereby the present invention may be more readily understood.

Figure 1:
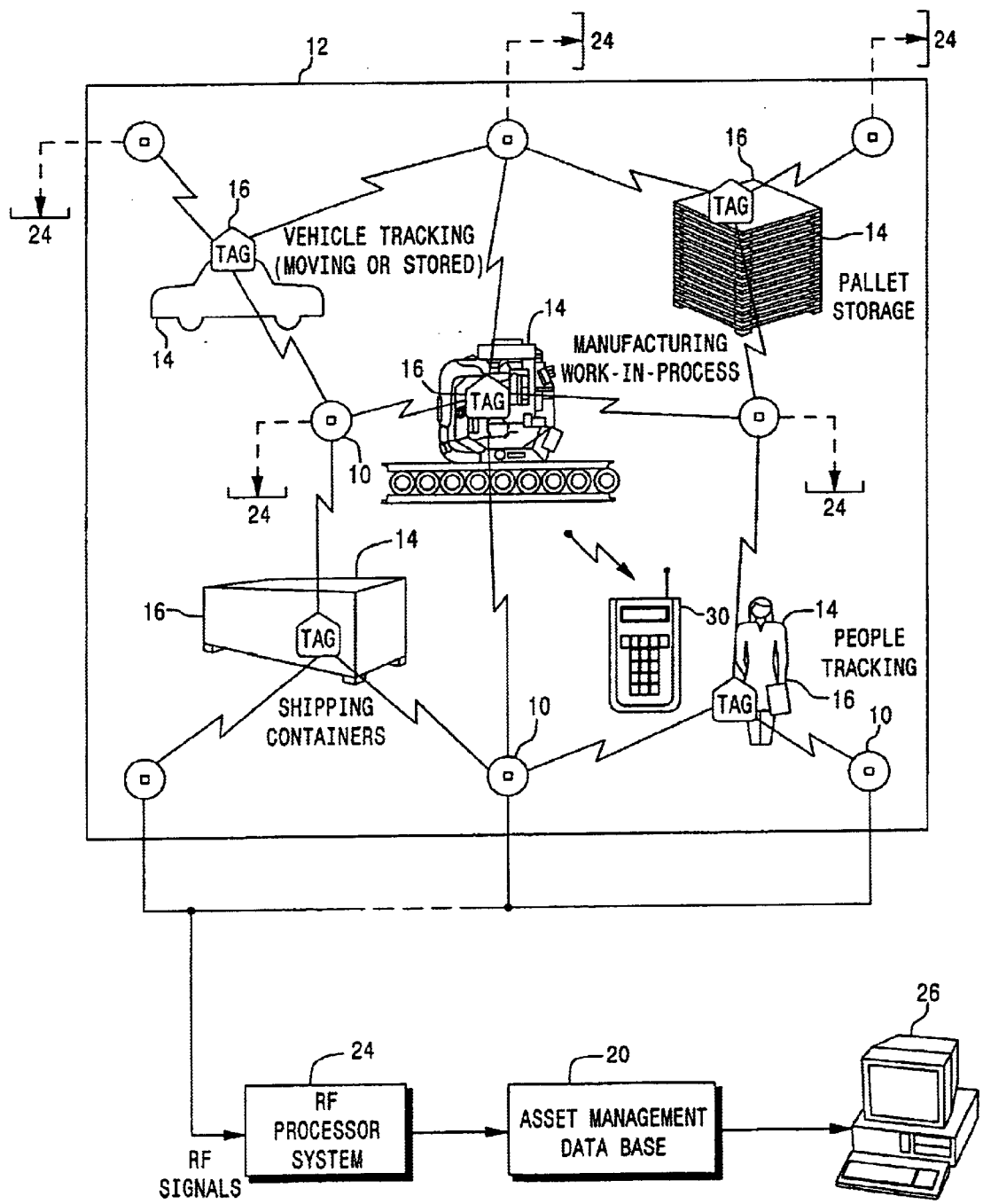
FIG. 1 diagrammatically illustrates the general architecture of a tagged object tracking and location system detailed in the U.S. Patents to Belcher et al, Nos. 5,920,287, and 5,995,046.
Figure 2:
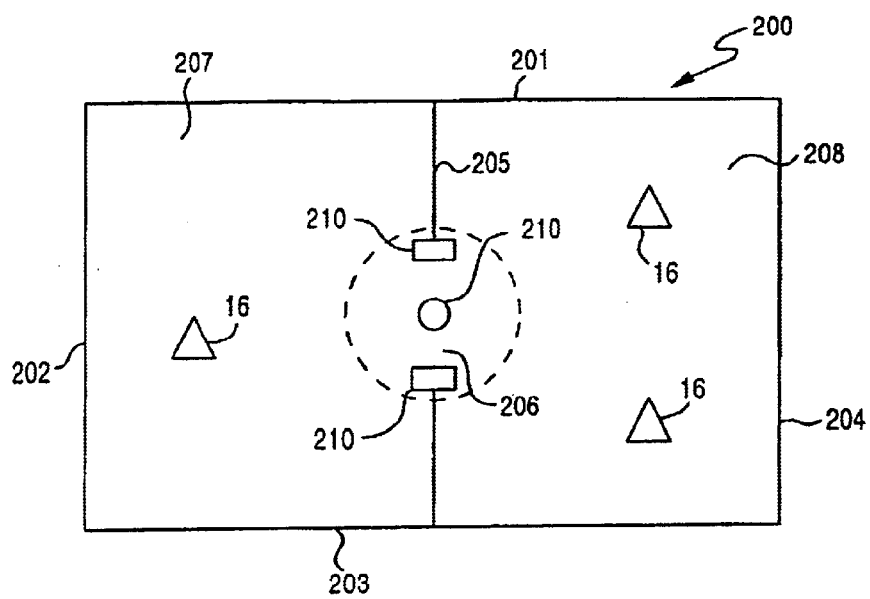
FIG. 2 is a diagrammatic plan view of a reduced complexity monitored environment in which a object location system of the type disclosed in the above-referenced U.S. Patents to Belcher et al, and shown FIG. 1 may be installed.

Attention is initially directed to FIG. 2, which is a diagrammatic plan view of a reduced complexity monitored environment 200, in which an object monitoring and location system of the type shown in FIG. 1 and disclosed in the above-referenced '287 and '046 patents, may be installed. In the present example, and as described in the above-referenced '290 and '079 applications, the environment 200 has a generally rectangular perimeter defined by four, rectangle-defining, perimeter walls 201, 202, 203 and 204, and also having an interior wall 205 that subdivides the environment into two adjacent sections 207 and 208. In addition, the interior wall 205 is shown as having a doorway 206 between sections 207 and 208, and corresponds to an increased sensitivity region for which AC magnetic field coverage is desired.

It will also be understood that the tagged objects do not move frequently (for example, the objects may be comprise an inventory of parts or pieces of equipment retained in storage) and/or the tagged objects in one of the sections 207 and 208 would normally not be expected to be moved to the other section. As such, each of the tags 16 may be programmed to normally 'blink' an encoded RF burst at a relatively slow repetition rate. However, should any tagged object be moved and pass through the increased sensitivity region (here, doorway 206), it is desired to have immediate knowledge of that passage, as well as subsequent tracking of the movement of the object.

Figure 3:
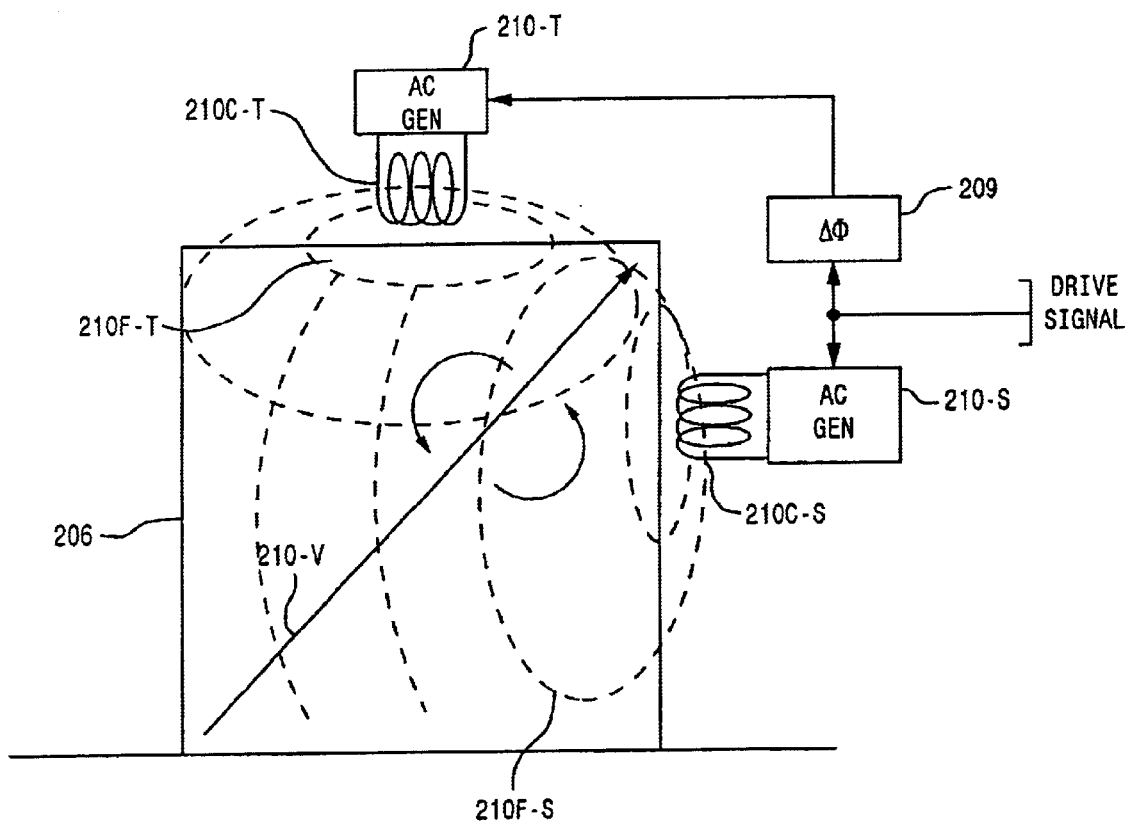
FIG. 3 is a diagrammatic elevation view of a portion of the monitored environment of FIG. 2, showing magnetic field coils orthogonally spatially distributed adjacent to a monitored region, and driven by associated drive circuits in a mutually offset phase relationship to realize a composite two-dimensionally rotating AC magnetic field.

As diagrammatically illustrated in FIG. 3, to satisfy this objective for the case of the coverage area or region of interest, such as the doorway 206, the present invention places a plurality of relatively short range, magnetic field proximity-based, tag-programming generators 210, two of which are shown at 210-T and 210-S, proximate to the doorway. As pointed out in the above-referenced co-pending '290 and '079 applications relatively short coverage range magnetic field generators are especially suited for confined space applications such as doorways, gates, and the like.

Moreover, the low frequency of the AC magnetic field emitted by a respective magnetic field generator is capable of penetrating thin metals such as foils, where radio signals are totally blocked. As a non-limiting example, a relatively low frequency within a range of frequencies (e.g., 9–135 KHz) routinely used for induction transmissions world wide may be employed. It may also be noted that the use of a short range device means that a large number of generators and tags may be employed in a single facility without interfering with one another.

The magnetic field generators are oriented such that their field producing output coils, respectively shown at 210C-T and 210C-S, have their axes coplanar with the two dimensional coverage region, so that their associated magnetic fields 210F-T and 210F-S are spatially orthogonal to one another in the monitored region (doorway 206). Thus, for the present example of a doorway, one or more of magnetic field generators (e.g., generator 210-T) may be placed above the top of the doorway, and one or more other generators (e.g., generator 210-S) placed along the side of the doorway 206, so that their coil axes are mutually spatially orthogonal.

In addition, for a given excitation AC frequency, the drive or magnetic field carrier frequency signal applied to the magnetic field generator 210-T is phase offset, as by means of a delay circuit 209, by a prescribed phase differential, e.g., a quarter of a cycle (or ninety degrees), relative to the drive frequency applied to the other (spatially orthogonal) magnetic field generator 210-S. As pointed out above, for an equal amplitude drive signal for each of two substantially identical magnetic field generators, a composite AC magnetic field 210-FC is produced within the doorway 206 that exhibits a generally circular rotation at the applied carrier frequency, which may be on the order of 100–150 KHz, as described in the above referenced co-pending applications.

Because the respective AC magnetic field produced by each generator's field coil includes a magnetic field component that is orthogonal to the plane of the rotating composite field vector 210-V, the rotating field coverage produced by the orthogonally oriented pair of phase offset generators is effectively independent of tag orientation. Moreover, it has been found that its coverage is on the order of better than ninety-nine percent—which constitutes a marked improvement over the ninety-five percent coverage of a non-rotating field system.

As referenced previously, the phase of the coil drive signals may be other than ninety degrees and/or the coils may be spatially non-orthogonal. This would enable the shape of the resulting composite AC magnetic field to have an elliptical rather than a circular rotation.

Figure 4:
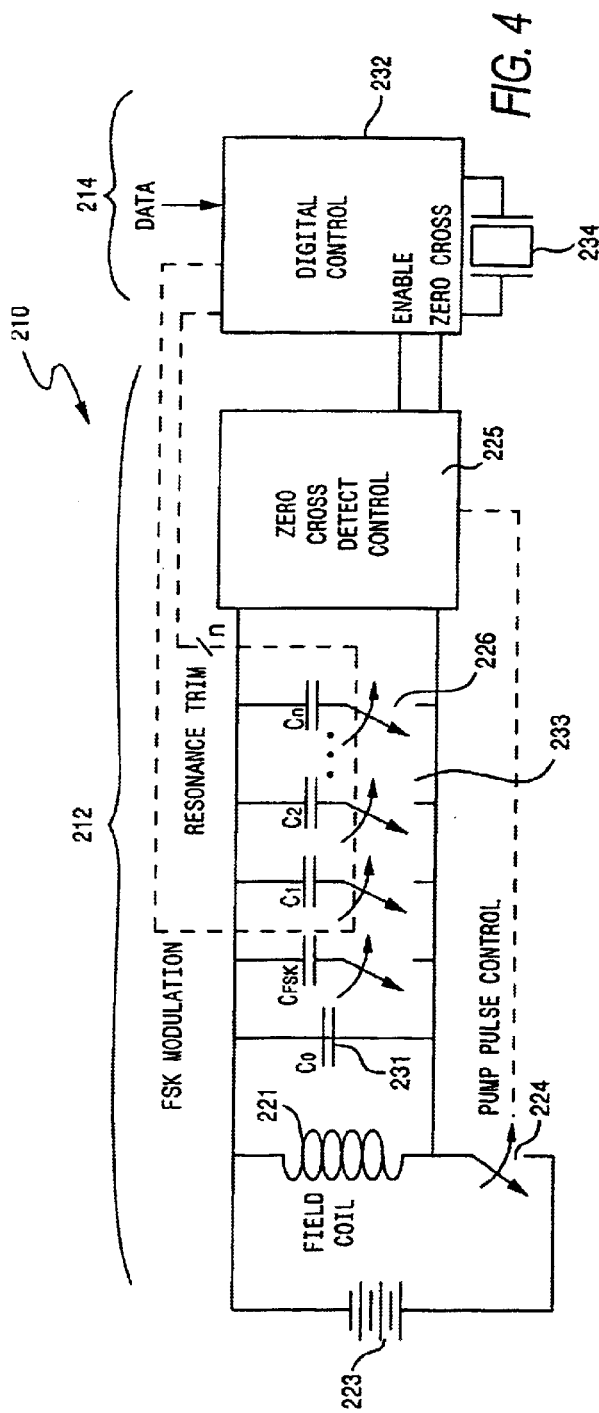
FIG. 4 shows a first embodiment of a magnetic field generator of the type described in the above-referenced co-pending '340, '290 and '079 applications.
Figure 5:
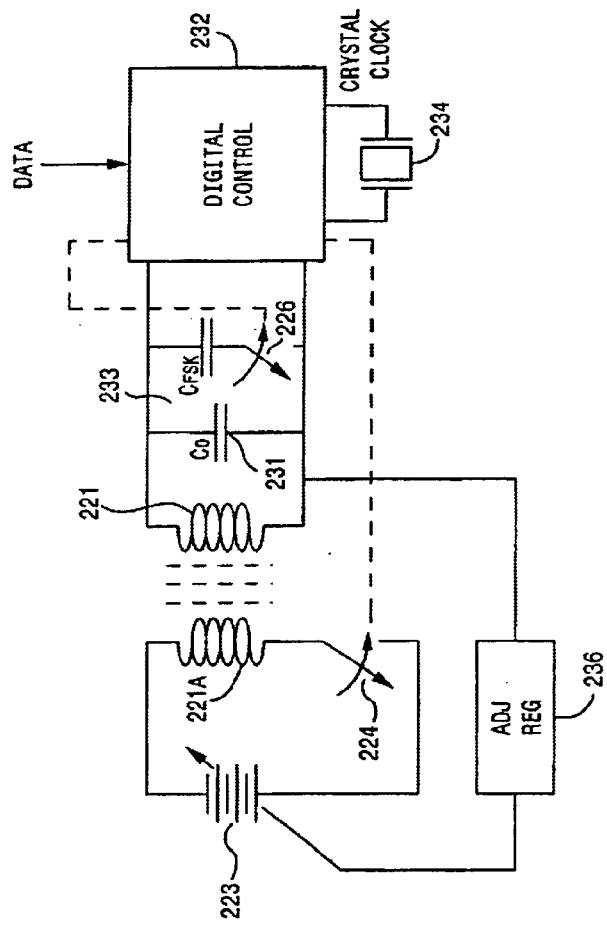
FIG. 5 shows an alternative embodiment of a magnetic field generator of the type described in the above-referenced co-pending '340, '290 and '079 applications.

In order to provide the ability to selectively program its output frequency, a respective AC magnetic field generator 210 may be configured as a frequency selectable device, of the type disclosed in the above-referenced '290, '340 and '079 applications, and diagrammatically illustrated in FIGS. 4 and 5. The generator may be operated in a multi-frequency (FSK) mode, as described in the '340 and '290 applications, or in a selectable, fixed frequency mode, as described in the '079 application.

A first embodiment of the magnetic field generator is shown in FIG. 4 as including an analog section 212, which generates a non-propagating AC magnetic field, and an associated digital section 214 which sets the resonant frequency of magnetic coil—capacitor components of the analog section 212 at a precisely pre-tuned frequency, in accordance with digital data supplied to the digital section 214. The analog section 212 includes a magnetic field coil 221, to which a relatively large amplitude energizing current is supplied by a DC power supply 223.

The power supply is coupled to the field coil 221 by way of a 'pumping' switch 224. The magnetic field coil 221 is small compared to the operating frequency and the volumetric extent of its resonant magnetic field 220, so that the energy in the magnetic field that emanates from and surrounds the field coil 221 is not propagated, but is physically confined relatively close to the coil, as in a typical solenoid. Because the curving electromagnetic field generated by the generator is virtually impossible to defeat by tag orientation, it provides a substantially strong coupling of the AC magnetic field with the sensing coil of a tag proximate thereto.

As described above with reference to FIG. 3, distributing multiple magnetic field generators in a spatially orthogonal arrangement around a region of interest (such as above and alongside a doorway) and driving the generators of different (orthogonal) axes with a differential phase relationship (90°) produces a composite rotating AC magnetic field that ensures complete coverage of the region.

A zero-crossing detector 225 is coupled in parallel with a resonant ('tank' or 'ringing') circuit formed by the field coil 221 and one or more capacitors 231 of a capacitor circuit 233. This detector is used to periodically close pumping switch 224 in a fly-back manner, to provide a DC current boost to the coil 221 from the battery, compensating for resistive losses in the ringing circuit. The pumping signal generated by the zero-crossing detector 225 provides for switch closure at or near the point at which the resonating current signal in the tank circuit crosses zero. This pumping signal has a duration for a small fraction of a cycle of the resonant frequency of the magnetic field, and may be optimized for the intended range of operation of the generated field and the size of the coil 221. Selective closure of one or more of the switches 226 by the supervisory microcontroller 232 in accordance with a frequency-selecting digital code may be employed to place two or more capacitors 231 in parallel with the coil, thereby controllably tuning the resonant frequency of the generated AC magnetic field.

The clock reference employed by the microcontroller 232 to control the pumping switch 224 may use the coil 221 and one of the capacitors of the tank circuit, or a separate clock source, such as a crystal oscillator 234. This separate clock source serves as a reference for the microcontroller 232 for measuring the resonant frequency established by the tank circuit at transmitter initialization and periodically thereafter, ensuring that the resonant frequency is at its intended value.

During calibration, a small valued 'trim' capacitor may be controllably switched in and out of the tank circuit to set the desired frequency of the field generator. Thereafter, the switch to the selected capacitor is closed to establish the desired output frequency of the generator. The use of a set of trim capacitors allows the generator's output frequency to be very precisely set its frequency at a value (e.g., F=100.2 KHz) that is readily distinguishable from other normal factory background electrical and electronic noise.

FIG. 5 shows a second, reduced complexity implementation of the magnetic field generator 210, that eliminates some of the analog circuitry of FIG. 4 at the cost of requiring accurate, temperature-stable components in the resonant LC network. In this alternative magnetic field generator, a relatively low inductance, auxiliary coil 221A is transformer-coupled with the high inductance field coil 221. The auxiliary coil 221A is coupled to the battery through the pumping switch 224, which is controlled directly by microcontroller 232. Since the tank circuit is DC-isolated from the pumping switch, a relatively simple switch can be used.

Each of the magnetic field generator configurations of FIGS. 4 and 5, when employed in heavy industrial (high noise environment) applications, has a power control loop, to provide for correction of the magnetic field level, thereby maintaining communication performance, when the system is affected by the proximity of a large metallic body such as a passing automobile or forklift. The power source 223 may be adjusted by a control signal generated by monitoring the level of the voltage present in the resonant LC circuit. The power source 223 may be controllably varied by means of an adjustable regulator 236, with the detected resonant circuit voltage fed back via a feed back link to the adjustment portion of the regulator, forming a closed loop.

Figure 6:
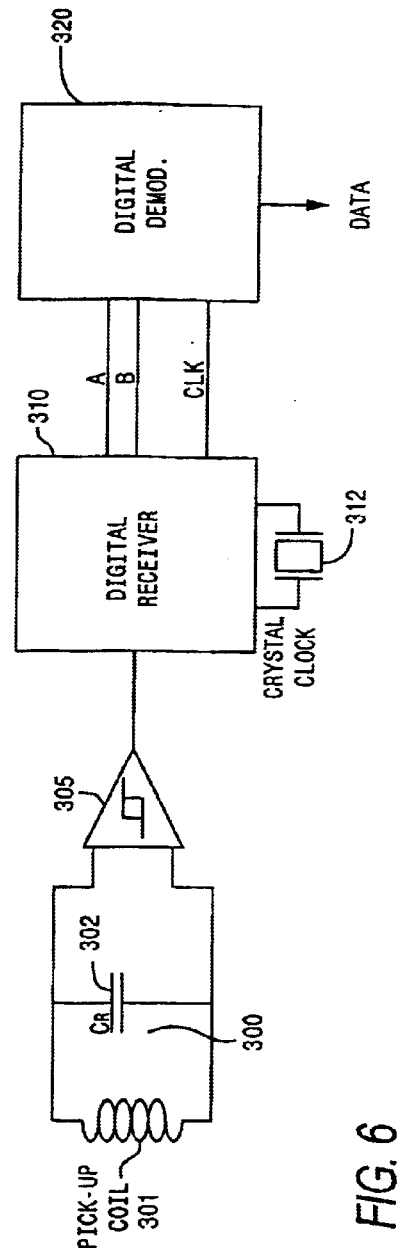
FIG. 6 diagrammatically illustrates the configuration of a magnetic field receiver unit for use with the FSK magnetic field generators of the '340 and '290 applications.

FIG. 6 diagrammatically illustrates the configuration of a magnetic field sensing unit 240 for a respective tag for use with an FSK modulated AC magnetic field as described in the '290 application. As shown therein, the detector comprises a resonant (LC tank) detector circuit 300 having a magnetic field-sensing coil 301 coupled in parallel with a capacitor 302. The parameters of the tank circuit components are such that the tank circuit 300 resonates at a frequency between the two FSK frequencies employed by the FSK-modulating magnetic field generator 210. As a non-limiting example of using frequencies of F1=114.7 KHz and F2=147.5 KHz, the tank circuit 300 may have a resonant frequency of 131 KHz.

The resonant tank circuit 300 is coupled to a sense amplifier 305, which amplifies the voltage produced by the tank sensor circuit for the desired receiver sensitivity and buffers the detected voltage to the appropriate logic level for use by a digital receiver/demodulator 306. Receiver/demodulator 306 includes a digital receiver 310, referenced to a crystal clock 312. The receiver clock is set to a frequency that corresponds to the difference between the FSK frequencies of the selected modulation pair F1/F2. Thus, for frequencies F1=114.7 KHz and F2=147.5 KHz, the receiver clock may be set at 32.8 KHz. This reduced clock frequency serves maintains very low power consumption at low cost. The use of such a relatively low reference frequency in the receiver requires a slower data rate, since one clock cycle of the receiver clock represents only 3.4–3.8 FSK clock cycles.

As described in the '290 and '340 applications, the digital receiver 310 may employ complementary buffer paths A/B that operate on alternate sample periods one-half the period of the received data spread code. This ensures that at least one of the two buffer paths will not be sampling data during transitions in the received FSK frequency. The receiver integration time is sufficiently long to count the number of rising edges in a received FSK signal, and readily differentiate between the two valid FSK frequencies (e.g., F1=114.7 KHz and F2=147.5 KHz), to determine when a frequency change occurs, and to reject other FSK signals and/or noise.

The digital demodulator 320 contains a state machine that demodulates the data by comparing a received sequence of FSK tones with a predefined start-of-message sequence (corresponding to a start synchronization code) As a non-limiting example, a start-of-message sequence may comprise a plurality of successive samples at one FSK frequency or tone (such as three symbol periods at the higher of the two FSK tones), followed by a plurality of successive samples at the second FSK frequency (e.g., three symbol periods at the lower of the two FSK tones). Upon detecting this sequence, the state machine initializes the data demodulation circuitry, so that received data may be clocked out as it is detected and demodulated.

Data values of '1' and '0' are represented by respectively difference sequences of the two FSK tones. As a non-limiting example, a logical 'one' may correspond to one symbol period at the higher FSK tone (147.5 KhZ) followed by one spreading chip period at the lower FSK tone (114.7 KHz); a logical 'zero' may correspond to one symbol period at the lower FSK tone (114.7 KHz), followed by one symbol period at the higher FSK tone (147.5 KhZ). Similar to detecting the start of a message, the demodulator's state machine may detect the end of a message by comparing a received sequence of FSK tones with a predefined end-of-message sequence. As a non-limiting example, the end-of-message sequence may be complementary to the start-of-message sequence, described above.

In an alternative implementation, the magnetic field receiver may employ a phase detector and a quadrature phase shift circuit resonant at the center of the two FSK tones. This eliminates the requirement for a large spectral separation between the tones, so as to allow a narrower receiver bandwidth with better sensitivity and reduced susceptibility to interference. For example, the higher FSK tone may be reduced to 127 KHz, while still using the efficient 32.8 KHz system clock.

Figure 7:
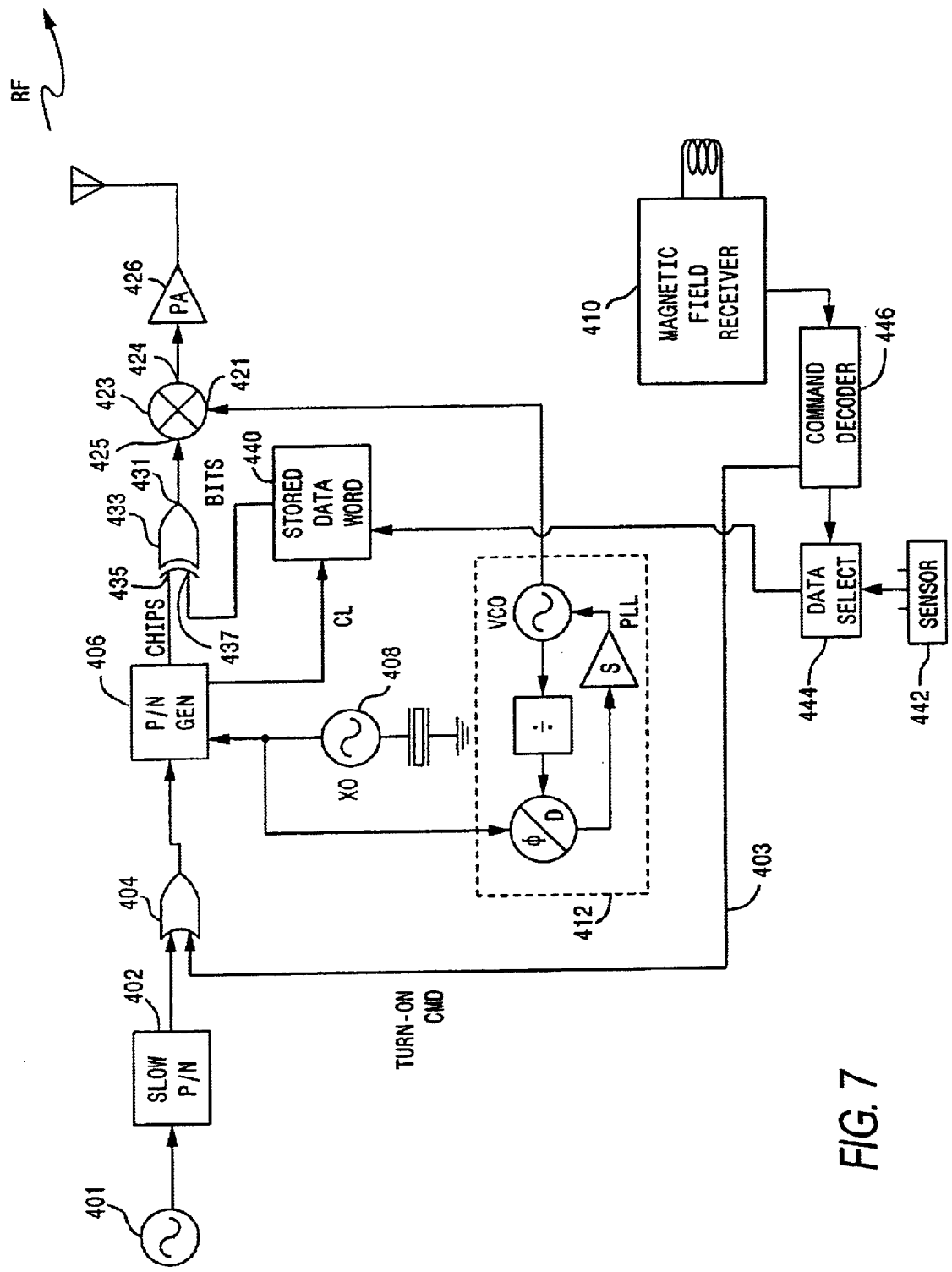
FIG. 7 shows the manner in which a tag transceiver unit of the radio location and tracking system of the Belcher et al patents may be modified to incorporate an AC magnetic field receiver.

FIG. 7 shows the manner in which the tag transceiver used in the radio location and tracking system of the type detailed in the above-referenced Belcher et al patents (such as that shown in FIG. 4 of U.S. Pat. No. 5,920,287) may be modified to incorporate a magnetic field receiver, such as the encoded magnetic field detector disclosed in the '290 and '340 applications and described above with reference to FIG. 6, or a non-modulated detector of the type shown in FIGS. 8 and 9 to be described.

As shown in FIG. 7, the tag transceiver has an oscillator 401, the output of which is coupled to a variable pseudo random (PN) pulse generator 402. The PN generator 402 normally generates series of relatively low repetition rate (for example, from tens of seconds to several hours), randomly occurring 'blink' pulses that are coupled through an OR gate 404 to a high speed PN spreading sequence generator 406. These blink pulses define instances at which the tag randomly transmits or 'blinks' bursts of wideband (spread spectrum) RF energy to be detected by the tag transmission readers, in order to locate and identify the tag using time-of-arrival geometry processing of the identified first-to-arrive signals, as described above. The PN generator 402 is also coupled to receive a control signal on line 403 from magnetic field sensing circuitry shown in broken lines 410.

In response to sensing a magnetic field, the tag's magnetic field sensing circuitry takes prescribed action, such as coupling a blink rate change signal (e.g., changes the binary state of line 403 from its default, low blink rate representative level to a high blink rate logic level) to the variable PN generator 402. This increases the pulse rate at which 'blink' pulses are produced by generator and coupled through OR gate 404 to the high speed PN spreading sequence generator 406. As a consequence the tag will blink at an increased rate that serves to alert the tracking system of the proximity of the tagged object to an 'increased sensitivity' region where the magnetic field generator is installed.

In response to an enabling 'blink' pulse, the high speed PN spreading sequence generator 406 generates a spreading sequence of PN chips. The PN spreading sequence generator 406 is driven at the RF frequency output of a crystal oscillator 408. This crystal oscillator provides a reference frequency for a phase locked loop (PLL) 412, which establishes a prescribed output frequency. The RF output of PLL 412 is coupled to a first input 421 of a mixer 423, the output 424 of which is coupled to an RF power amplifier 426. Mixer 423 has a second input 425 coupled to the output 431 of a spreading sequence modulation exclusive-OR gate 433. A first input 435 of the exclusive-OR gate 431 is coupled to receive the PN spreading chip sequence generated by PN generator 406. A second input 437 of exclusive-OR gate 431 is coupled to receive the respective bits of data stored in a tag data storage memory 440, which are clocked out by the PN spreading sequence generator 406.

The tag memory 440 may comprise a relatively low power, electrically alterable CMOS memory circuit, which stores a multibit word or code representative of the identification of the tag. The tag memory 440 may also store additional parameter data, such as that provided by an associated sensor 442 installed on or external to the tag, and coupled thereto by way of a data select logic circuit 444. The data select logic circuit 444 is further coupled to receive data represented by the sensed magnetic field. The data is decoded by a command and data decoder 446. The data select logic circuit 444 may implemented in gate array logic and is operative to append any data it receives to that already stored in the tag memory 440. It may also selectively couple sensor data to memory, so that the tag will send only previously stored data. It may also selectively filter or modify data output by the command and data decoder 446.

When a magnetic field from the magnetic field generator is detected by the receiver 410, data represented by the received field is written into the tag memory 440, via the data select logic circuit 444. The command and data decoder 446 also couples a signal through OR gate 404 to the enable input of the PN generator 406, so that the tag's transmitter may generate a response RF burst, in the same manner as it randomly and repeatedly 'blinks' a PN spreading sequence transmission containing its identification code and any parameter data stored in memory 440, as described above.

As described above, where the monitored environment is of the type that contains significant man-made and natural noise levels that can limit performance, rather than use an FSK-encoded magnetic field, the programming magnetic field communication link to the tag may employ a single (unmodulated) frequency. In this event, the same magnetic field generator architecture shown in FIGS. 4 and 5, described above, may again be employed; however, rather than being used in a multifrequency (FSK) mode, its tuning parameters are set to produce a single output frequency.

Figure 9:
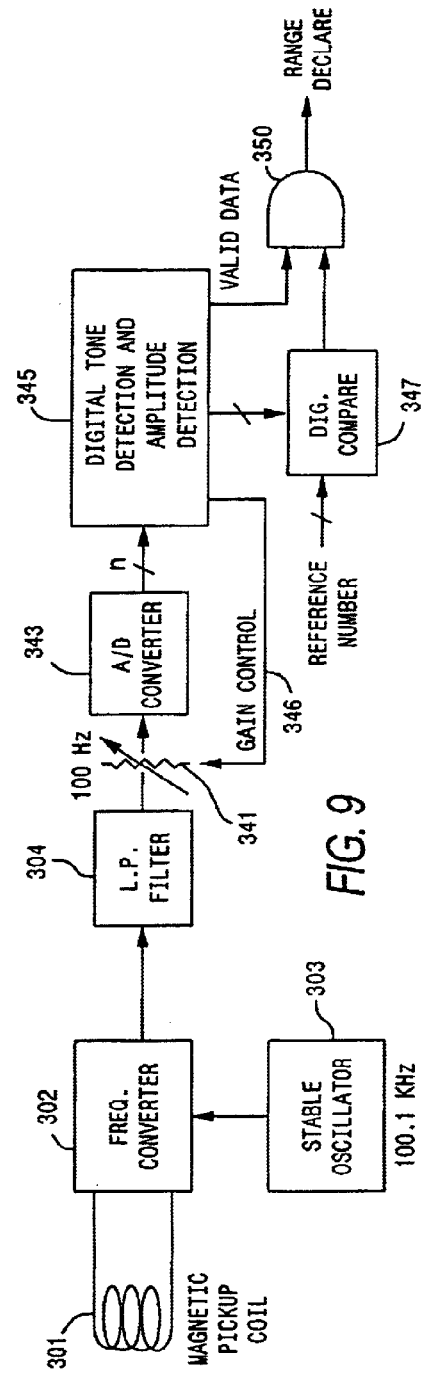
FIG. 9 diagrammatically illustrates the configuration of an AC magnetic field receiver unit for detecting an unmodulated AC magnetic field in accordance with a second embodiment of the invention disclosed in the '079 application.
Figure 8:
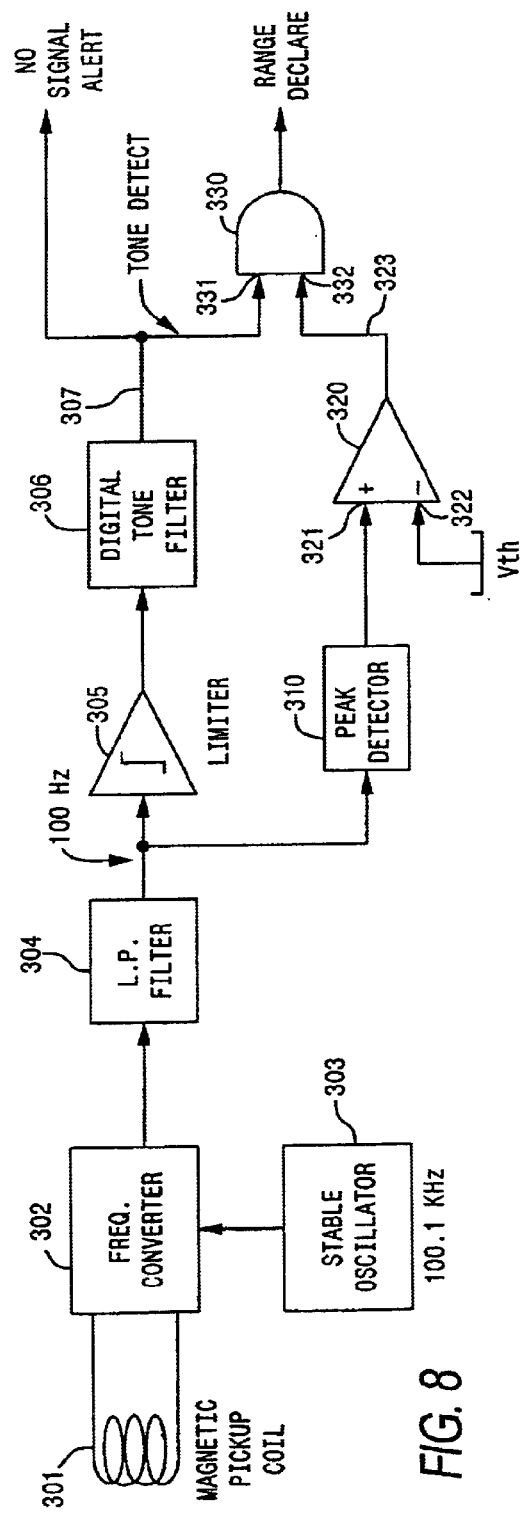
FIG. 8 diagrammatically illustrates the configuration of an AC magnetic field receiver unit for detecting an unmodulated AC magnetic field in accordance with a first embodiment of the invention disclosed in the '079 application.

For a single frequency application, the reduced complexity magnetic field sensing unit may be configured as disclosed in the '079 application, and shown in FIGS. 8 and 9. In the embodiment of FIG. 8, the fixed frequency sensing unit includes a magnetic field-sensing coil 801, coupled to a downconverter (mixer) 802, that is referenced to a highly stable local oscillator 803, such as one producing an AC magnetic field frequency F=100.1 KHz. The output of the downconverter 802 is a very low (baseband) frequency (e.g., 100 Hz), which is filtered in a very narrowband lowpass (100 Hz) filter 804 (such as a solid state RC filter), to produce the desired narrowband (100 Hz) output frequency.

This narrowband sinusoid signal is applied to each of a hard limiter 805 of a valid AC magnetic field tone detection path, and a peak detector 810 of a range detection path. In the valid field tone detection path, the 'squared' 100 Hz signal produced by the hard limiter 805 is coupled to a digital tone filter 806. The digital tone filter may be implemented as a simple digital counter, which counts the 100 Hz square wave signal from the limiter during a prescribed interval.

During its enable interval (which effectively represents a valid AC field detect integration interval), if the contents of the counter 806 reach a prescribed count value, its output changes state (e.g., goes high (logical '1') on line 807, to indicate that a valid AC magnetic field signal has been detected. Line 807 is coupled to downstream tag circuitry, such as the transceiver shown in FIG. 7, and to a first input 831 of an AND gate 830.

Rather than detect a single tone (magnetic field carrier frequency), the digital tone filter may be configured to operate against a plurality of fixed frequency AC signals. For example, if the field generator were operative to transmit 100.11 KHz, the received tone would again be the difference frequency (e.g., 110 Hz). Employing digital tone circuitry that distinguishes between different tones provides for receipt of a plurality of different commands conveyed by the respective AC magnetic field signals.

In the range detection path, the output of the peak detector 810 is coupled to a first input 821 of a threshold detector 820, a second input 822 of which is coupled to receive a reference (threshold) voltage Vth representative of a prescribed range or proximity to the source. This range detection path serves as an analog representation of the received magnetic field signal level. Signal level with induction coupling provides a practical way to determine distance or proximity, since the magnetic field strength varies inverse exponentially to a relatively high exponential power, typically range$^{-3}$.

The output 823 of threshold detector 820 indicates whether the tag is within a prescribed proximity of the AC source. This output is coupled to a second input 832 of AND gate 830, the output of which is also coupled to downstream tag circuitry. AND gate 830 provides a relatively simple means to indicate that a valid AC magnetic field tone has been detected and that the tag is within a predetermined proximity of the field generator. By combining the output of the tone detector and the output of the amplitude detector, AND gate 830 produces a 'range declare' bit that functions to indicate a range threshold has been crossed that is guaranteed to be the desired signal. If the desired signal is lost, for example due to noise, a 'no signal alert' on output line 807 would operate to indicate that validity of the 'range declare' bit is suspect.

FIG. 9 diagrammatically illustrated the circuit architecture of a second embodiment of an unmodulated magnetic field sensing unit for a respective tag, disclosed in the '079 application, in which the detected signal output is processed digitally. For this purpose, the narrowband sinusoid signal output by a narrowband low pass filter 904 is coupled through a variable gain circuit 941 and sampled by an analog-to-digital converter (ADC) 943 to a prescribed (n-bit) code resolution. The digitized sample is coupled to a digital processor 945, which performs both digital tone detection and amplitude detection on the sample signal.

The digital processor based embodiment of FIG. 9 has the ability to detect the AC field tone in the presence of noise that is hundreds of times greater than the tone. This is achieved by operating the components upstream of the ADC 943 in a linear mode, by the processor 945 feeding back a gain control signal shown at 946 to set the analog system gain of variable gain circuit 941 just prior to the ADC 945. Secondly, digitally processing the signal integrates the energy only in a very narrow (e.g. 5 Hz) bandwidth, to further improve the quality of the threshold estimate. This is in contrast to the first embodiment of FIG. 8, in which the 50 Hz bandwidth is limited, thus setting a lower bound on sensitivity.

The digital processing embodiment also measures the amplitude, based on the output of the ADC 945 and the gain control setting. This amplitude measurement value is coupled to a digital comparator 947 and compared against a reference number to determine range. As in the embodiment of FIG. 8, the range declaration is validated by combining it in an AND gate 950 with a signal detection (valid data) bit.

Figure 10:
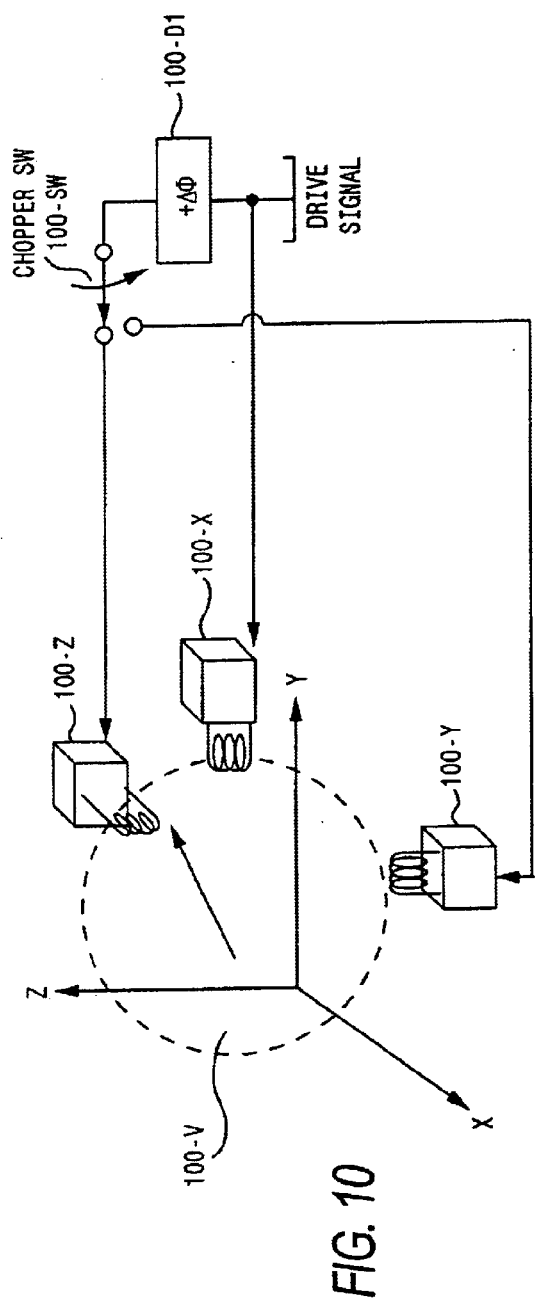
FIG. 10 is a diagrammatic perspective view of a portion of the monitored environment of FIG. 2, showing a three-dimensional spatial distribution of magnetic field drive circuits in an offset phase using a chopper switch to realize a composite three-dimensionally rotating AC magnetic field. The chopper switch is operative to switch between which orthogonal coil is active every cycle, to obtain alternating rotations of the magnetic field in orthogonal planes.

While the foregoing description details the generation of a two-dimensionally rotating field, the invention may also be used to generate a three-dimensionally rotating field. In this case, as shown in FIG. 10, three sets of AC magnetic field generators 100-X, 100-Y and 100-Z may be distributed along three mutually orthogonal coordinate axes (X,Y,Z) adjacent to a monitored volume 100-V of interest. These spatially orthogonal coils are driven by three respective magnetic field excitation drivers at an offset phase (e.g. 90°) as shown by delay unit 100-D. A chopper switch 100-SW is operative to select which orthogonal coil is energized on a cycle-by-cycle basis, thereby alternating the plane of the resultant rotating magnetic field vector on a cycle-by-cycle basis. As a consequence, the composite AC magnetic field produced by the three orthogonal field generator subsystems will exhibit a generally spherically rotation within the coverage volume 100-V at the applied carrier frequency.

As will be appreciated from the foregoing description, the desire to achieve AC magnetic field coverage for communications with a location monitoring tag close to one-hundred percent, regardless of tag orientation, is effectively achieved in accordance with the present invention, by a combination of the diverse spatial orientation of a plurality of magnetic field coils, and the driving of those coils in a prescribed phase relationship. This results in a composite AC magnetic field that rotates (at the carrier frequency of the coil drive signal) over the entirety of the spatial coverage area.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of communicating with objects whose locations are monitored on a continuous basis using RF transmissions from tags associated with the objects within an asset management environment having a plurality of tag transmission readers geographically distributed within and/ or around the asset management environment, at least one area in the asset management environment being an area of increased sensitivity region prone to orientation null problems for receiving tag emissions, wherein outputs of said tag transmission readers are coupled to an object location processor which processes outputs of said tag transmission readers to locate said tags and thereby their associated objects within said monitored environment comprising the steps of:

(a) generating an AC magnetic field that rotates over a region of increased sensitivity into which an object may enter and which is representative of information intended for said object entering said region; and (b) at said object entering said region of increased sensitivity detecting said rotating AC magnetic field.

2. A method according to claim 1, wherein said step (a) comprises generating a plurality of respectively spatially and phase offset AC magnetic fields that form within said region a composite AC magnetic field that rotates over said region.

3. A method according to claim 1, wherein step (a) comprises providing a distribution of spatially offset magnetic field generators proximate to said region, and causing said distribution of spatially offset magnetic field generators to generate said phase offset AC magnetic fields and thereby form within said region said composite AC magnetic field that rotates over said region, and spatially provides complete magnetic field coverage for said region irrespective of the orientation of said object.

4. A method according to claim 3, wherein said region comprises a passageway connecting separate portions of, or has mobility within, said monitored environment.

5. A method according to claim 1, wherein step (a) comprises frequency shift key encoding said rotating AC magnetic field in accordance with information intended for said object.

6. A method according to claim 1, wherein said rotating AC magnetic field is a non-modulated AC magnetic field.

7. A method according to claim 1, wherein step (a) comprises providing, proximate to said region, a plurality of AC magnetic field generators having a multi-dimensional arrangement of output field coils, axes of which are non-parallel with one another, that are adapted to be driven with phase offset AC drive signals and thereby produce said composite AC magnetic field that rotates over said region at the frequency of said AC drive signals.

8. An arrangement for communicating with an object whose locations are monitored on a continuous basis using RF transmissions from tags associated with the objects entering a region of increased sensitivity within an asset management environment having a plurality of tag transmission readers geographically distributed within and/or around the asset management environment, at least one area in the asset management environment being an area of increased sensitivity region prone to orientation null problems for receiving tag emissions, wherein outputs of said tag transmission readers are coupled to an object location processor which processes outputs of said tag transmission readers to locate said tags and thereby their associated objects within said monitored environment comprising:

a plurality of AC magnetic field generators at each region of increased sensitivity and having a multi-dimensional arrangement of output field coils, axes of which are proximate said region and non-parallel with one another, and which are adapted to be driven with phase offset AC drive signals and thereby produce a composite AC magnetic field that rotates over said region at the frequency of said AC drive signals; and a magnetic field receiver installed on said object and being operative, in response to detecting said rotating AC magnetic field, to cause said object to perform a prescribed function.

9. An arrangement according to claim 8, wherein said magnetic field generators are operative to frequency shift key encode said rotating AC magnetic field in accordance with information intended for said object.

10. An arrangement according to claim 8, wherein said plurality of AC magnetic field generators are operative to generate non-modulated AC magnetic fields.

11. For use with a system for communicating with an object within a monitored environment, wherein an RF transmission from a tag associated with said object is detected at one of a plurality of monitoring locations containing a tag transmission reader, and an output of said tag transmission reader is processed to identify said object within said monitored environment, an arrangement for controlling the operation of a tag that comes within a prescribed proximity of prescribed region of increased sensitivity within said monitored environment, said arrangement comprising:

a plurality of AC magnetic field generators at said region of increased sensitivity and having a multi-dimensional arrangement of output field coils, axes of which are proximate said region and non-parallel with one another, and which are adapted to be driven with respective phase offset AC drive signals and thereby produce a composite AC magnetic field that rotates over said region at the frequency of said AC drive signals; and a magnetic field receiver with said object and being operative to detect said rotating AC magnetic field.

12. An arrangement according to claim 11, wherein said magnetic field generators are operative to frequency shift key encode said rotating AC magnetic field in accordance with information intended for said object.

13. An arrangement according to claim 11, wherein said plurality of AC magnetic field generators are operative to generate non-modulated AC magnetic fields.

* * * * *